Sept. 20, 1971     R. B. CORBETT     3,605,487
ALIGNMENT OF SPECIMEN IN APPARATUS FOR TESTING
MATERIAL FOR RESISTANCE TO STRESS
Original Filed June 21, 1965

United States Patent Office

3,605,487
Patented Sept. 20, 1971

3,605,487
ALIGNMENT OF SPECIMEN IN APPARATUS FOR TESTING MATERIAL FOR RESISTANCE TO STRESS
Robert B. Corbett, Mars, Pa., assignor to Corbett Associates, Inc., Mars, Pa.
Original application June 21, 1965, Ser. No. 465,675. Divided and this application Oct. 31, 1969, Ser. No. 873,773
Int. Cl. G01n 3/08
U.S. Cl. 73—95                                            5 Claims

ABSTRACT OF THE DISCLOSURE

There is disclosed testing apparatus for determining accurately the creep properties of material, such as hot-tensile creep or creep-rupture or stress-relaxation. The apparatus includes a train for applying axial force to a specimen 16. The force is applied aligned along the specimen, with a deviation not exceeding 5 percent from alignment. The alignment is achieved by suspending the specimen in the force-applying train from couplings 38 including bearings 300 assuring that the specimen is suspended and supported by the bearings and not the threads 84 of the couplings.

CROSS-REFERENCE TO RELATED APPLICATIONS

This application is a division of application Ser. No. 465,675, filed June 21, 1965 to Robert B. Corbett, and now abandoned.

BACKGROUND OF THE INVENTION

This invention relates to an apparatus for testing materials, and more particularly, to an apparatus for testing materials which are heated and then subjected to external loading to establish the effects of heating and loading on the test specimen material.

In the testing of products, it is essential to use as precise testing conditions as practicable to make comparisons of materials and to preclude the introduction of any error-producing extraneous factors such as temperature variation or specimen misalignment which could interfere with the reliability of the testing and conclusions of testing.

The specimen under test is connected in a stress-producing train which applies the stressing force to the specimen. It is essential that the stressing force be applied as precisely as practicable, aligned along the train and particularly aligned along the specimen and it is an object of this invention to achieve such precise alignment. It is an object of this invention to assure that the stress load, usualy the tensile load, is applied as nearly axial as practicable to the specimen to avoid any effect of non-axiality.

SUMMARY OF THE INVENTION

An important feature of the present invention is that axial alignment can be readily and precisely obtained within the train of elements exerting the pulling effort on the test specimen and in this way more precise testing results are obtained in determining the strength of the specimen. In the absence of precise axial alignment, erroneous readings are obtained. To obtain optimum results, 15 percent alignment or better must be obtained and this is beyond the capacity of most of the presently used testing apparatus. In contrast with this, the present invention can easily obtain orders of alignment of 15 percent or less. The permissible range of misalignment depends upon the character of the material being tested. For ductile materials, 15 percent misalignment is tolerable; but for brittle materials, misalignments of even in the order of 5 percent is objectionable. The present invention, since it precisely aligns the train of components, can secure the referenced fine degrees of alignment which are much beyond the range of alignment capabilities of existing test apparatus.

BRIEF DESCRIPTION OF THE DRAWINGS

The foregoing and additional objects of the present invention will become apparent from a consideration of the following description, which proceeds with reference to the accompanying drawings, wherein.

DESCRIPTION OF PREFERRED EMBODIMENT

Figure 2:
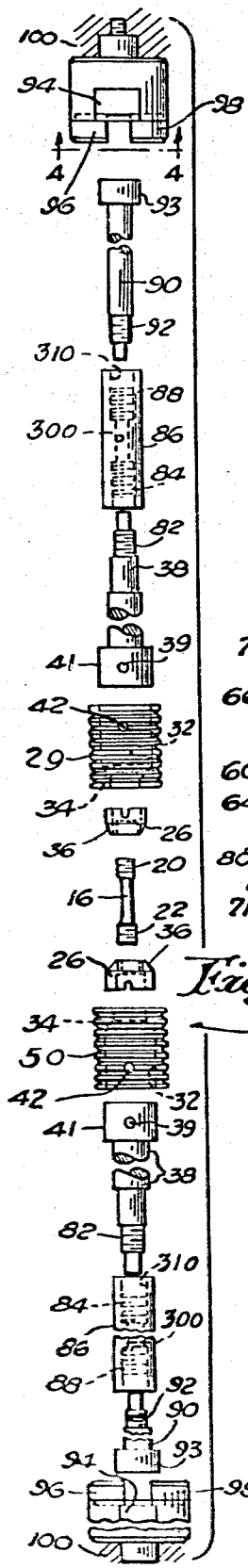
FIG. 2 is an exploded view of the test apparatus, but not including the heating elements and heating furnace.
Figure 1:
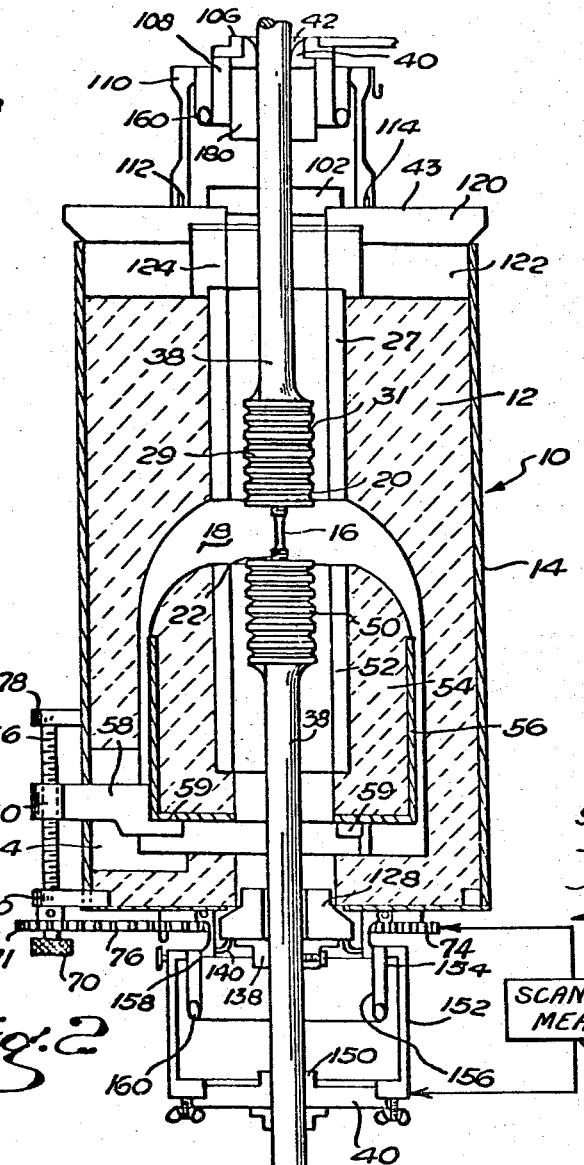
FIG. 1 is a view, partly in longitudinal section, of apparatus according to this invention including the heating furnace and its components.

Referring now to the drawings, and particularly to FIG. 1, the furnace, designated generally by reference numeral 10 includes a container or chamber 18 and has refractory insulated walls 12 and a surrounding jacket 14. The test specimen, designated generally by reference numeral 16 and having a precisely dimensioned size and gage length, is disposed within chamber 18 and its opposite ends 20, 22, which may be threaded are secured by screwing into insert grips 26, there being one insert grip 26 for each end.

Figure 3:
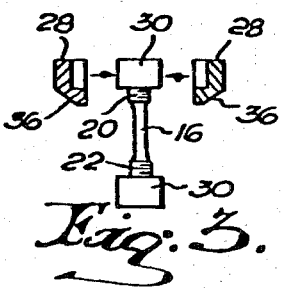
FIG. 3 is a detail view illustrating one type of coupling between the test specimen and its connecting structure; and, FIG. 4 is a view taken on line 4—4 of FIG. 2.

In the case of button-head type of specimens, the inserts must be of the split type shown in FIG. 3 and designated in this case by reference numeral 28. The exterior dimensions of the inserts 26 and 28 are the same as that both threaded end and button end specimens of all sizes can be accommodated with one pair and size of a hot-grip coupling 29.

A stationary heating element 27 surrounds an upper hot grip coupling 29 which has a serrated surface 31. The pitch of the serrations is approximately 55°, which is found to be the optimum angle for receiving radiant heat from the heating element 27. The interior of the hot grip coupling 29 has a tapered seat 34 to receive the two coupling inserts 26, 28, having tapered surfaces 36, which come into seating engagement with the tapered seat 34, when the inserts are assembled over the enlarged end 30 of the test sample and are then passed through opening 32 of the coupling 29. The coupling 29 is secured to an extension rod 38 with an end 41 which is proportioned to fit within opening 32 of the hot-grip coupling 29 and has an opening 39 which is registerable with opening 42. A pin (not shown) is then passed through aligned openings 39, 42 to couple the parts together. The rod 38 passes through the heating apparatus and is sealed after it passes through the upper end wall 43 by a collar 40 and packing 42. The chamber 18 is fully sealed so that there is no circulation of atmosphere and there is avoided any chimney effect caused by rising currents of heated air. In previous devices which were unsealed, the outside air was drawn into the system and the gage length of the test specimen was swept by air which non-uniformly heated the test specimen introducing substantial erroneous readings.

Free movement of the rod 38 is permitted without either vertical or transverse restraint and yet the chamber is completely sealed, this being provided by a diaphragm which will be described later.

The lower portion of the tensile-producing train is substantially the same as the upper portion except in details which will be described.

The lower hot-grip coupling 50 is heated by a heating element 52 which surrounds coupling 50 and is supported by a refractory body 54 having a shell 56. The heating element and its support structure is suspended on a number of vertically movable legs 58, approximately three in number which are spaced 120° apart, and which project inwardly to provide supporting surfaces 59. Each leg includes a nut 60 which extends through a slot 64 in refractory body 12 and shell 14 and is connected to a vertical screw 66 having a knob 70 which permits the support legs 58 to be adjusted upwardly and downwardly in accordance with the size of the specimen 16 so that the line of sight radiation from heating element 52 encompasses only the serrated surfaces of the lower hot-grip coupling 50. The screw 66 is also turnable by a sprocket 71 which is driven along with the other two sprockets through chain 76. The chain 76 interconects each of the three spaced screws 66 so that the legs 58 are simultaneously raised and lowered to raise and lower the heating elements 52 and to maintain a planar supporting relationship through the support surfaces 59.

Each screw is journaled in spaced plates 78, 80 which project radially from the shell 14 and permit the screw to turn freely either by the knob 70 or by means of the sprocket wheels 71 acting through the chain 76.

The purpose of having the lower heating element adjustable is so that the heating element will be in line of sight only with the hot grip coupling 50 and as the test specimen 16 elongates under heat and tensile force communicated thereto through the upper and lower rods 38, the heating element 52 is caused to lower. None of the heating effect goes directly from the heating elements to the test specimen; instead, the heating elements radiantly heat the hot grip couplings which have serrations in the order of approximately 55° and these in turn communicate heat by conduction to the specimen. The purpose of having the serrations is to provide a greater heating surface which will collect more heat than a plane surface.

The upper and lower ends of the furnace are substantially similar. At the upper end, the rod 38 is passed through a refractory split ring 102 and then through a collar 40 and packing 42 which are secured to a lift ring 106. The lift ring 106 is fastened to the end of a diaphragm rolling seal 108 which is in the form of a membrane secured respectively to rings 106 and cylinder 110. The lower end of the cylinder is sealed by an O-ring seal 112 within a groove 114 in the end of the cylinder 110. The cylinder rests on an upper enclosure 120 which in turn is supported on two refractory layers 122 and 124. The upper end of the chamber is thus completely enclosed, while at the same time permitting the pull rod 38 to move upwardly. There is no opportunity for circulation of air or other atmosphere through the top of the chamber.

At the lower end of the chamber, the pull rod 38 passes through a split refractory plug 128 having an oversize opening and which is held by a collar 138 until clips 140 are positioned to hold it in place. The lower rod has a collar 150 secured thereto which draws the cylinder 152 downwardly therewith, and with it one end 154 of a diaphragm 156 which has a movable, flexible wall secured at its end 158 to a fixed part of the structure. In this way, the lower rod 38 can move downwardly and it will flex the diaphragm but without enabling any leakage paths to develop. As the rod moves downwardly, it will carry with it the collar 138 which will move away from the plug 128. In this way, no leakage paths are permitted to develop during movement of the lower rod 38 or the upper rod 38 and moreover, due to the flexible nature of the upper and lower diaphragm 108 and 156, no transverse forces are exerted on either the upper or lower rods to affect in any manner alignment of the specimens.

The two rods are sealed in substantially similar manners and by means of refractory components which will not deteriorate under exposure to the heat which is encountered in these zones of the furnace of the test apparatus.

Portions of the membrane of the diaphragm may be separated if necessary by glass beads, sand 160, or the like, to insure rolling contact and proper operation of the diaphragm.

At the lower end of the apparatus, where the lower pull rod 38 passes through refractory disc 40, the refractory disc can be secured by wing nuts or the like to the cylinder 152.

Precise alignment of the train of components exerting a tensile force on the specimen is obtained in the manner next to be described. Each of the components forming the train is coaxially aligned with precision so that at the time a pulling force is exerted, it will exert such tensile force in alginment with the specimen in a manner not substantially beyond approximately ±5 percent deviation from the axis connecting the two points of tensile force exertion on the specimen. Consequently, the uniformity of pull across the cross section of the specimen is developed.

At both ends of the specimen train a plate 96 having a slot 94 admits the end 93 of pull rod 90. The adaptor 98 in turn is secured to stationary part 100. Considering that in the modern testing procedures there is a preference to use smaller test sample specimens, and having a variance of brittleness to low ductility there is a considerable importance attached to the alignment and securement of such alignment within a very precise range. The present invention does, of course, by reason of the novel train secure such precision of alignment and well within the range of material sizes and compositions.

In use, the test specimen 16 is combined with the hot grip coupling inserts 26 or 28, and the hot grip inserts 26 or 28 are positioned within opening 32 of the hot grip couplings 29 and 50 with the tapered sides bearing against a complementary side 34 within the couplings. Each coupling is then secured by a pin (not shown) to rod 38 by passing through aligned openings 39, 42, in the couplings 29 and 50 and ends 41 of the pull rods 38. Each pull rod 38 is fastened to a coupling 86 of a second pull rod 90 by means of the threaded sections 84, 88 which serves merely to hold while the bearing surfaces 300 and 310 on either side of the threads contribute to the alignment. The ends 93 of each pull rod 90 are then fitted within a quick change adaptor 98 of member 100 and the train is then adapted to develop tensile force on the specimen 16. The tensile force is communicated to the specimen after the specimen has been heated to a preferred temperature by means of the heating elements 27, 52 which communicate their heating effect by radiant heat transfer to the serrated surfaces of the hot grip coupling means 29, 50. The hot-grip coupling elements transfer the heat conductively to the specimen 16 from the opposite ends. None of the heat is transferred directly to the specimen 16; in this way, there is avoidance of erroneous readings by the thermocouples. The lower heating elements are adjusted vertically by means of the screws 66 which can raise and lower the heating element by turning the screws and raising and lowering the arms 58 which provide support surfaces 59 for the lower heating element. Where the test specimen is longer, then the heating element is correspondingly lowered, and conversely, where the test specimen is short, the heating element is raised by turning the screws 66 in the direction which raises the support 59. Also, in order to obtain the same heating effect, as tensile force produces an elongation of the test specimen, the lower heating element is lowered as for example by rotating sprocket wheels 71 which is connected by chain 76 to each other associated with each of the three spaced screws 66 and arms 58 so that the heating element 52 is lowered and heat is communicated radiantly only through the hot grip coupling 50 which in turn transmits heat to the specimen 16 by heat conduction. In this way, the mechanism of transfer of heat remains the same in spite of the elongation of the specimen. The furnace described has only two heated zones and has completely omitted shunts or other zones, making it possible to uniformly heat any specimen regardless of its dimension and even while the specimen has elongated under tests. The uniformity of the temperature along the gage length is maintained at all times and, since there are not heated walls opposite the gage length, there is no direct radiation to effect the thermocouple readings.

The adverse influence of the chimney effect is avoided by completely entrapping atmosphere within the chamber 18. There is no circulation of air or other atmosphere within the chamber 18 because each of the opposite ends of the enclosure are completely closed. As either the upper or lower pull rod 38 is displaced, there is moved with it the collar 40 and seal 42 and the connected portion of the diaphragm 108 through the left ring 106 and while the diaphragm conflects, it does not open any leakage paths. Conversely, when the lower pull rod 38 moves downwardly, pulling with it the cylinder 152, the diaphragm 156 can be operated. Since the enclosure of the specimen is completely sealed, while at the same time permitting movement of the pull rods, the chimney effect or circulation of air effect which is prone to produce a temperature differential along the length of the gage is effectively prevented. The chamber can, if desired, be filled with an inert atmosphere or it can be filled with air, whichever is desired.

Movement of the rod 38 can be operatively connected by suitable sensing means 200 if desired, and is adapted to actuate the sprocket wheels 74 so that the screws 66 are turned in whatever direction is necessary to effect a lowering of the lower heating element 52 so that such lowering is coordinated with extension of the specimen 16 and radiant heating effort is continuously applied to the hot grip coupling and none of the radiant heating is communicated to the specimen as the specimen is elongated. In this way, the effects of the heating are more closely controlled and the mechanism of heating of the specimen is at all times by conduction of heat to its ends through the coupling, and in this way the heating effect is indirect and derived by this mechanism from the heating elements.

At the upper end of the furnace is a heat shield 180 to safeguard the temperature and to protect the diaphragm by shielding the membrane from radiant heat.

Although the present invention has been illustrated and described in connection with a single example embodiment, it will be understood that this is illustrative of the invention and is by no means restrictive thereof. It is reasonably to be expected that those skilled in the art can make numerous revisions and adaptations of the invention, and it is intended that such revisions and adaptations will be included within the scope of the following claims as equivalents of the invention.

What is claimed is:

1. Testing apparatus for testing a specimen of a material under test including a linear stressing train for supporting said specimen and exerting a stressing force thereon, said train comprising means including a screw-thread connection for mounting said specimen in said train in stressing-force receiving relationship, said screw-thread connection being interposed between said specimen at one end and the remainder of said stressing train at its other end, said connection including a bearing providing bearing supporting surfaces for said connection immediately contiguous to the screw thread of said connection at both ends of said screw thread providing at both ends a bearing surface on each side of the screw thread, the said bearing being cooperative with said screw thread connection to align said specimen precisely in said train along the line of said stressing force so that said stressing force is aligned along said specimen.

2. The apparatus of claim 1 wherein the stressing train includes hot-grip coupling means for coupling the specimen in the train and insert means having tapered external surfaces, the hot-grip couplings being connected to the specimen through said insert means and wherein the couplings have tapered seats for seating the insert means on their tapered surfaces, which seats serve as bearing surfaces in addition to the surfaces of the bearings to contribute to the maintaining of the precise alignment of the stressing force.

3. The apparatus of claim 2 wherein the specimen has screw thread means which is engaged by a screw thread means in the insert means.

4. The apparatus of claim 2 wherein the insert means is an unthreaded clamping means and provides a seat for contributing to the precise alignment of the stressing force.

5. In an apparatus for testing materials, a train of components for exerting stressing force on a relatively small cross section specimen and adapted to effect such stressing force in alignment not substantially greater than 5 percent deviation from alignment, comprising coupling means having bearing surfaces which dispose the components in coaxial alignment with said specimen, threaded means forming a part of said train and engaged and supported by said bearing surfaces at both ends of said threaded means in train-aligning relationship, and a longitudinal member having a keyed connection in said train which defines such alignment within said 5 percent deviation tolerance, said threaded means having a coaxial connection with said longitudinal member.

References Cited

UNITED STATES PATENTS

| | | | |
|---|---|---|---|
| 3,107,524 | 10/1963 | O'Connor | 73—103 |
| 1,122,289 | 12/1914 | Loveland | 73—103 |
| 3,005,336 | 10/1961 | Wyman | 73—103 |

JERRY W. MYRACLE, Primary Examiner

U.S. Cl. X.R.

73—103